United States Patent [19]
Gebert et al.

[11] Patent Number: 5,698,097
[45] Date of Patent: Dec. 16, 1997

[54] OIL FILTER INCLUDING REPLACEABLE PRIMARY AND SECONDARY FLOW FILTER ELEMENTS

[75] Inventors: Hans Gebert, Heibronn-Bockingen; Rolf Möhle, Scheppach; Dietmar Sonntag, Remseck; Elke Bruss, Asperg; Dietwart Guntert, Sachsenheim; Hubert Müller, Stuttgart, all of Germany

[73] Assignee: Knecht Filterwerke GmbH, Stuttgart, Germany

[21] Appl. No.: 506,563

[22] Filed: Sep. 13, 1995

Related U.S. Application Data

[62] Division of Ser. No. 117,210, Sep. 14, 1993, Pat. No. 5,589,060.

[30] Foreign Application Priority Data

| Mar. 28, 1991 | [DE] | Germany | 41 10 307.6 |
| Sep. 20, 1991 | [DE] | Germany | 41 31 353.4 |
| Jan. 17, 1992 | [DE] | Germany | 42 01 041.1 |

[51] Int. Cl.$^6$ ................................. B01D 35/02
[52] U.S. Cl. .................... 210/248; 210/316; 210/317; 210/350; 210/438; 210/440; 210/442; 210/450; 210/454; 210/458; 210/DIG. 13
[58] Field of Search .................. 210/316, 317, 210/350, 440, 450, 454, 458, 484, 493.2, 496, DIG. 13, 248, 314, 457, 442

[56] References Cited

U.S. PATENT DOCUMENTS

| 2,453,405 | 11/1948 | Bolser | 210/350 |
| 2,487,146 | 11/1949 | Lasky | 210/350 |
| 2,642,187 | 6/1953 | Bell | 210/493.2 |
| 2,693,281 | 11/1954 | Winzen | 210/493.2 |
| 2,739,916 | 3/1956 | Parker | 210/493.2 |
| 2,797,811 | 7/1957 | Wilkenson | 210/484 |
| 2,801,006 | 7/1957 | Hultgren et al. | 210/438 |
| 2,929,506 | 3/1960 | Belgarde | 210/DIG. 13 |
| 3,867,294 | 2/1975 | Pall et al. | 210/493.2 |
| 4,094,791 | 6/1978 | Conrad | 210/248 |

Primary Examiner—Matthew O. Savage
Attorney, Agent, or Firm—Collard & Roe, P.C.

[57] ABSTRACT

An oil filter for internal combustion engines is disclosed herein. The filter includes a housing with a bottom arranged below an open top and a screw-on cover threadedly engaged within the open top. The housing includes an inlet duct, a first oil discharge duct in the bottom of the housing, and a second oil discharge duct in the bottom of the housing and coaxially surrounding the first oil discharge duct. A support part is provided within the housing having a first end which is connected to the cover in an axially force-transmitting manner and a second free end inserted into the first oil discharge duct when the cover fully threadedly engaged to the open end of said housing to sealingly close the first discharge duct, and is withdrawn from the discharge duct when the cover is removed from the open end of the housing to enable discharging of oil from the housing via the first oil discharge duct. The support part supports a primary flow filter element in a lower portion of the housing and a secondary flow filter element in an upper portion of the housing and fluidly connects the primary flow filter to the second discharge duct and the secondary flow filter to the first discharge duct. The cover, the support part, the primary flow filter, and the secondary flow filter can be removed from the housing as a unit. The primary and secondary flow filters are separable from the support part for replacement.

13 Claims, 5 Drawing Sheets

OIL FILTER INCLUDING REPLACEABLE PRIMARY AND SECONDARY FLOW FILTER ELEMENTS

This is a divisional of application Ser. No. 08/117,210, filed on Sep. 14, 1993, now U.S. Pat. No. 5,589,060.

The invention relates to a filter for liquids, in particular a lubricating-oil filter for an internal-combustion engine.

Such a filter for liquids is known, for example from U.S. Pat. No. 3,333,703. The filter for liquids shown there consists of a pot-shaped filter housing which, at its one end, is connected with a mounting head via a screw thread, and provided at its other open end with a screw-on housing cover. A filter element supported in the interior of the filter housing is provided with end disks and separates the crude space from the clean space. On the end disk of the filter element disposed opposite the housing cover, an overflow valve is mounted which, under certain operating conditions, establishes a connection between the crude space and the clean space. In connection with the other end disk of the filter element and the closed end of the filter housing, provision is made for a return check valve. A drawback with said design is, on the one hand, the waste disposal of the filter element, which consists of all sorts of different materials, and, on the other hand, that when the filter element is changed, at least the overflow valve is discarded because it is rigidly integrated in the end disk of the filter element.

Therefore, the problem of the present invention is to find a filter for liquids with a constructionally simple structure in connection with which the filter element can be discarded as waste separately and in a way friendly to the environment, whereby the other functionally important individual parts can be reused.

The solution to said problem is obtained with a filter for liquids with the features according to the invention.

BRIEF DESCRIPTION OF THE DRAWINGS

Exemplified embodiments according to the invention are shown in the drawing, in which.

Figure 1:
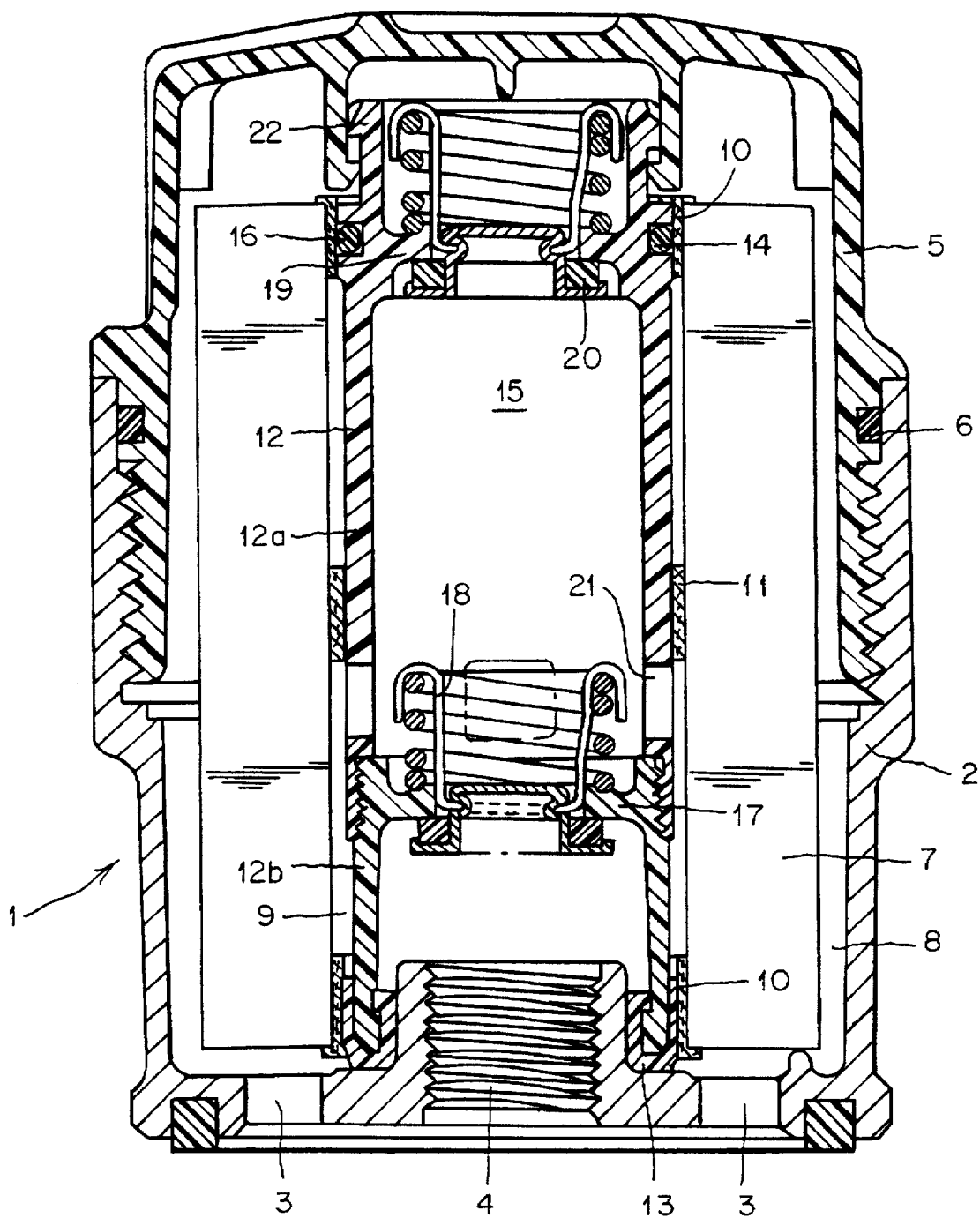
FIG. 1 shows a sectional view of the filter for liquids according to the invention.

A filter for liquids 1 according to FIG. 1 consists of a pot-shaped filter housing which, at its one end, is provided with the feed and discharge openings 3 and 4, respectively, and connectable, for example with a mounting head, and at its other end closed by a removable housing cover 5. Provision is made for a seal 6 between the screw-on housing cover 5 and the filter housing 2. A filter element 7 made of paper is designed as a star filter with glued pockets and separates the crude space 8 from the clean space 9. At each of its ends, it is provided on its inner circumference with a sleeve 10 made of strengthened paper. Furthermore, for stiffening the filter element 7, provision is made for a sleeve 11 in the center zone of the filter element 7. The manufacture of such a filter element from a single material assures that when the filter is changed, it can be discarded as waste in a way friendly to the environment.

In the filter housing, the filter element 7 is fixed by a sleeve-shaped support part 12 made of plastic, whereby the sleeves 10, which are rigidly joined with the filter element 7, rest against the seals 13, 14. The seal 13 is designed U-shaped and grips around the bottom end of the support part 12, so that a sealing is obtained at the same time between the crude and clean spaces 8 and 9, respectively, and the interior 15 of the support part. The ring-shaped seal 14 is supported in the top zone of the support part 12 in a matching groove 16. The support part 12 consists of the two individual parts 12a, b, which are screwed to each other via a thread. In an intermediate wall 17 of the lower individual part 12b of the support part 12, provision is made for a return check valve 18, so that on the one hand, the purified lubricating oil can flow off via the discharge opening 4 only starting with a predetermined pressure, and, on the other hand, running dry of the filter is avoided when the internal combustion engine is standing still. In an intermediate wall 19 of the top individual part 12 a of the support part 12, provision is made for an overflow valve 20, which, at a corresponding pressure difference, established a connection between the interior 15 of the support part 12 and the crude space 8. The top individual part 12 a of the support part 12 has the openings 21, which establish a connection between the clean space 9 and the interior 15 of the support part 12. In addition, the individual part 12 a can be engaged with the housing cover 5 via a snap connection 22, so that the housing cover 5 is screwed off from the filter housing 2, the filter element 7 is removed together with the support part 12.

With such a filter for liquids, it is assured in a constructionally simple way that when the filter element is changed, it can be disposed of as waste in a way friendly to the environment because of the single material used, and that the individual parts such as the support part 12, the valves 18, 20, and the seals 13, 14, which are required for the function, can be either reused or simply exchanged.

Figure 2:
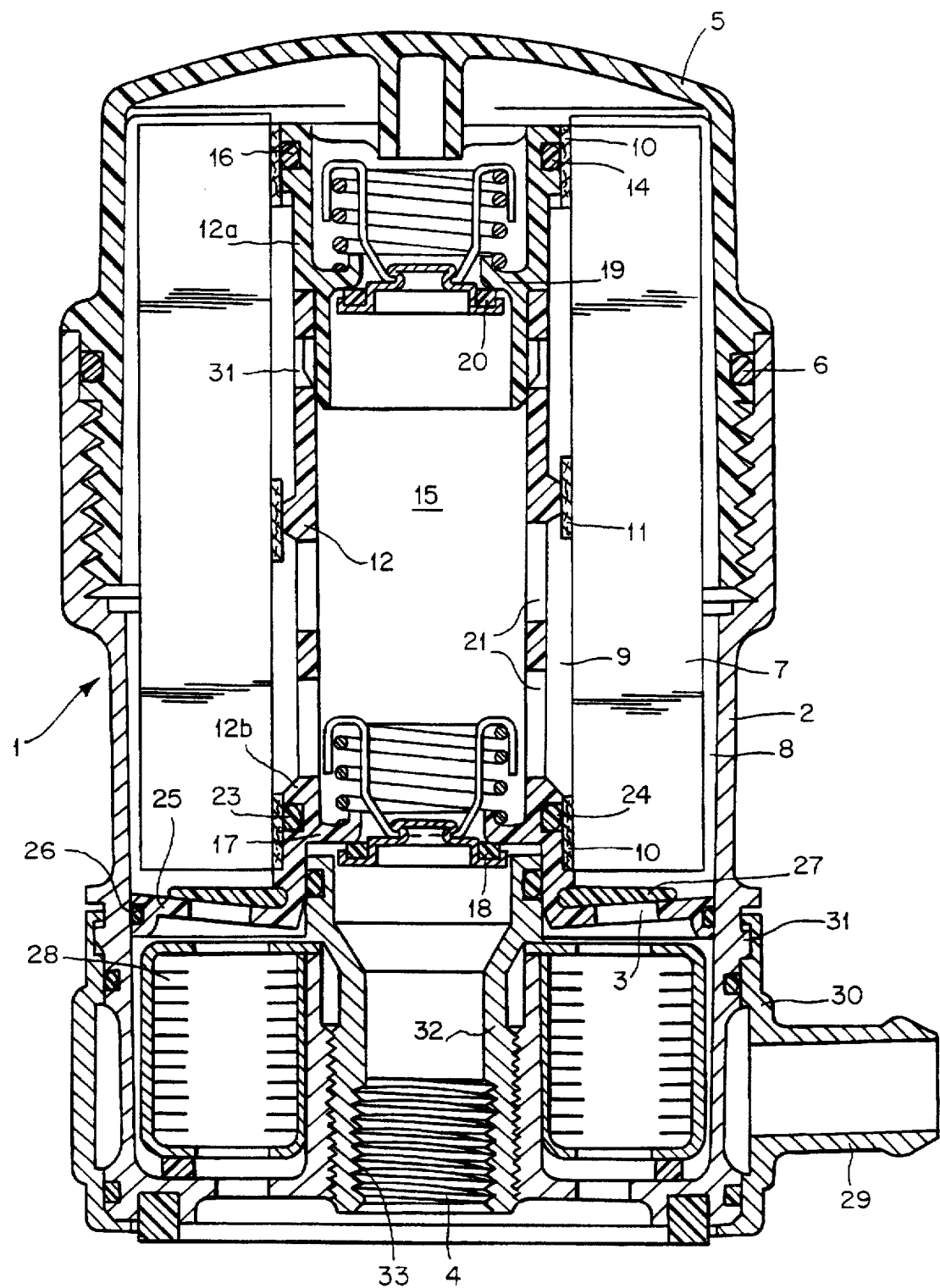
FIG. 2 shows a sectional view of a second embodiment of a filter for liquids according to the invention.

In the exemplified embodiment of a filter for liquids according to FIG. 2, the same reference numerals are used as in FIG. 1 for identical parts. These are:

| | |
|---|---|
| Filter 1 for liquids | |
| Filter housing 2 | with screw-on housing cover 5 |
| Feed opening 3 | |
| Discharge opening 4 | |
| Seal 6 | |
| Filter element 7 | |
| Crude space 8 | |
| Clean space 9 | |
| Sleeve 10 | |
| Sleeve 11 | |
| Support part 12 | with the individual parts 12 a, b, which are connected with each other via a snap connection 31 |
| Seal 14 | |
| Interior 15 | of the support part 12 |
| Groove 16 | for the seal 14 |
| Intermediate wall 17 | for receiving the return check valve 18 |
| Intermediate wall 19 | for receiving the overflow valve 10 |
| Openings 21 | for connecting the clean space 9 with the interior 15 of the support part 12. |

The bottom individual part 12b of the support part 12, which also receives a return check valve 18, is designed differently as compared to the exemplified embodiment according to FIG. 1, and has a groove 24 extending all around for receiving a seal 23. The lower end of the individual part 12b changes into a disk 25 having the feed openings 3 and, via a seal 26, rests against the filter housing 2. A return check valve 27 closing the feed openings 3 is supported in the individual part 12b of the support part 12 as well.

The filter 1 for liquids is different from the exemplified embodiment according to FIG. 1 particularly in that a heat exchanger 28 (indicated only in rough outlines) is additionally integrated in the filter housing 2, said heat exchanger being acted upon by the cooling water of the internal combustion engine, whereby the feed and discharge of the cooling water takes place via a sleeve-shaped connection part 30, which is fitted with the short feed and discharge pipe 29 and rotatably supported (snap closure 31) on the housing part 2. For holding the heat exchanger 28, a sleeve-shaped connection element 32 made of metal is screwed into filter housing 2, which connection element, at its top end rests sealed against the individual part 12b of the support part 12, and which, at its bottom end, has an inside thread 33 for connecting the filter 1 for liquids with the internal combustion engine via known means.

The properties and advantages stated with respect to the exemplified embodiment according to FIG. 1 apply to the exemplified embodiment according to FIG. 2 as well.

Figure 3:
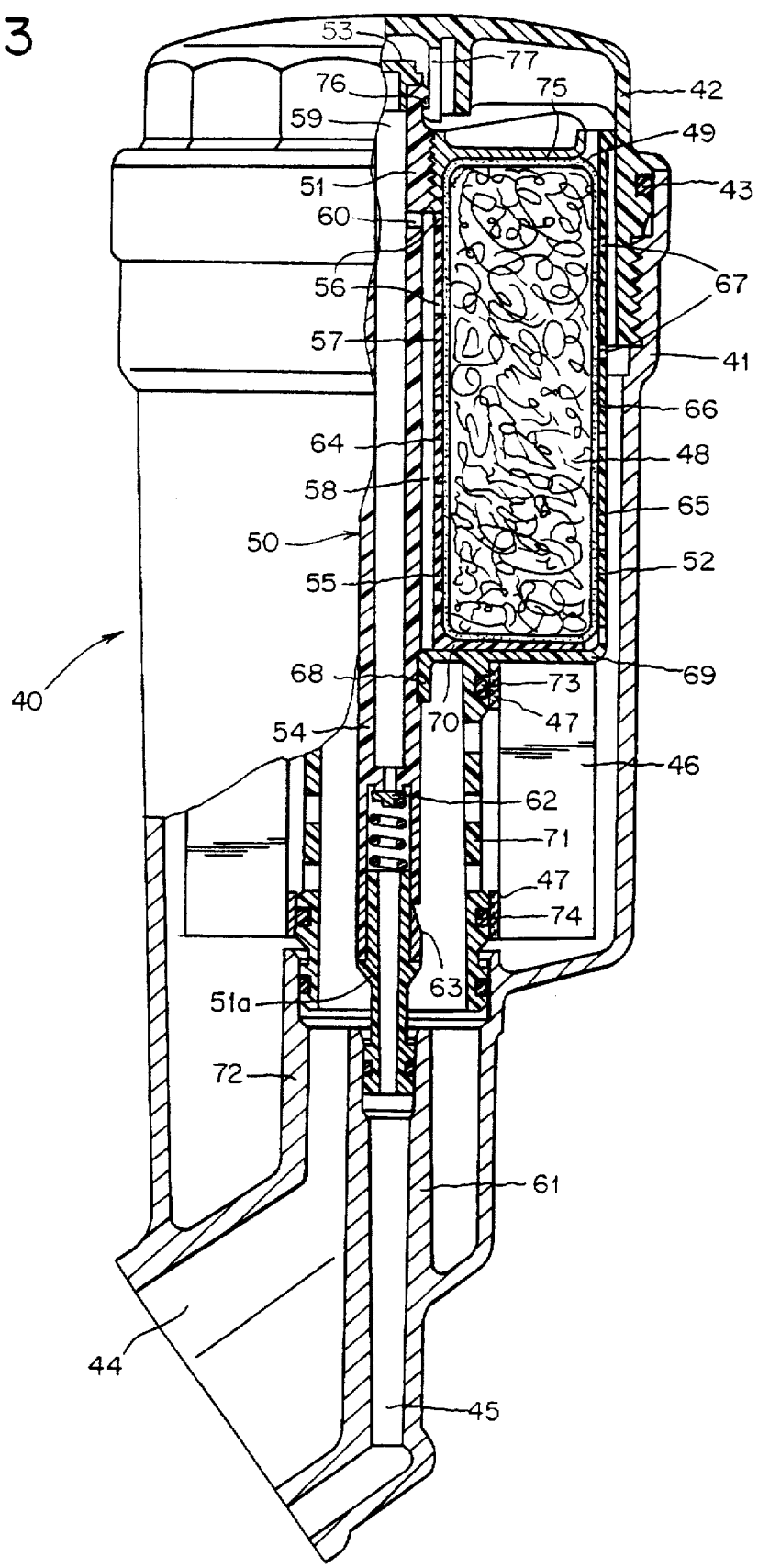
FIG. 3 shows a partially sectional view of a third embodiment of a filter for liquids according to the invention.

Another exemplified embodiment according to FIG. 3 contains a filter 40 for liquids which is designed as a primary/secondary flow filter. The filter 40 for liquids, which is arranged upright, contains a pot-shaped filter housing 41 made of aluminum pressure die-cast and a screw-on housing cover 42 made of plastic, between which provision is made for a seal 43. At the closed end of the filter housing 41, provision is made for feed and discharge ducts for the lubricating oil, whereby provision is made for a discharge duct 44 leading to the points of lubrication for the cleaned lubricating oil in the primary flow, and for a discharge duct 45 leading into the crank space for the cleaned lubricating oil in the secondary flow.

A primary-flow filter element 46 is made of paper (like the filter element according to FIGS. 1 and 2) and designed in the form of a star filter with glued pockets, and at each of its ends rigidly connected on the inside by glueing with a sleeve 47 made of strengthened paper.

A secondary-flow filter element 48 consists of stuffed cotton, which is received by an endless, ring-shaped hose 49 made of cotton. Since the two filter elements 46, 48 each consist of single materials, they can be disposed of as waste in a simple way, also separately, in a manner friendly to the environment.

For holding the filter elements 46, 48 in the interior of the filter housing 41, provision is made for a support part 50 made of plastic, which consists of the individual parts 51, 51a, 52, 53, which are manufactured by the injection molding process and welded or glued to each other. The individual part 51 consists of a central tube 54, to which in its upper zone, an L-shaped sleeve 55 is shaped by molding in one piece in such a way that a clean space 58 for the cleaned lubricating oil of the secondary-flow filter element 48 is formed between the outer wall of the tube 54 and the longer leg 57 of the L-shaped sleeve 55, said longer leg having the openings 56. Said clean space 58 is connected with the interior 59 of the tube 54 via a throttle bore 60 disposed in the upper zone of the tube 54, so that the upper zone of the tube 54 acts at the same time as a standpipe. At its lower open end, the tube 54 is sealingly supported in a short pipe 61 receiving the discharge duct 45 for the cleaned lubricating oil of the secondary-flow filter, whereby for receiving a return check valve 62, the lower end of the tube 54 is divided in two parts and the individual part 51 a is connected with the individual part 51 via a snap connection 63.

In order to obtain a ring-shaped pot part 64 for receiving the secondary-flow filter element 48, the individual part 52 consists of a Z-shaped angle part 65 with legs of different length, of which angle part the one leg 66 is provided with the openings 67 and forms the outer wall of the ring-shaped pot part 64, and of which the shorter leg 68 rests against the tube 54, and of which the center bridge 69 rests against the short leg 70 of the L-shaped sleeve 55, whereby said parts are welded to each other. A sleeve-shaped extension or covering-shaped extension 71 is shaped by molding on the center bridge 69 as one piece, said extension being sealingly supported in a short pipe 72 of the filter housing 2 and serving for receiving the primary-flow filter element 46, whereby the primary-flow filter element 46 rests via its sleeves 47 rests against the seals 73, 74, which are supported in matching grooves.

In order to close the ring-shaped pot part 64 receiving the secondary-flow filter and to prestress the secondary-flow filter element 48, a cover 75 designed as a type of winged nut is screwed together with the upper zone of the individual part 51 of the support part 50. Such termination and such prestress may be realized also, for example via a cover part with a spring and bayonet lock.

A snap device 76 mounted on the top end of the individual part 51 of the support part 50 engages in a matching counterpart 77 mounted on the housing cover 42, so that when the housing cover 42 is removed, the support part 50 together with the filter elements 46, 48 is removed at the same time. With this, the individual part 51 a engaging the short pipes 61, 72 and the sleeve-shaped extension 71 control the discharge ducts 44, 45 open, so that the oil present in the filter can drain off.

Figure 4:
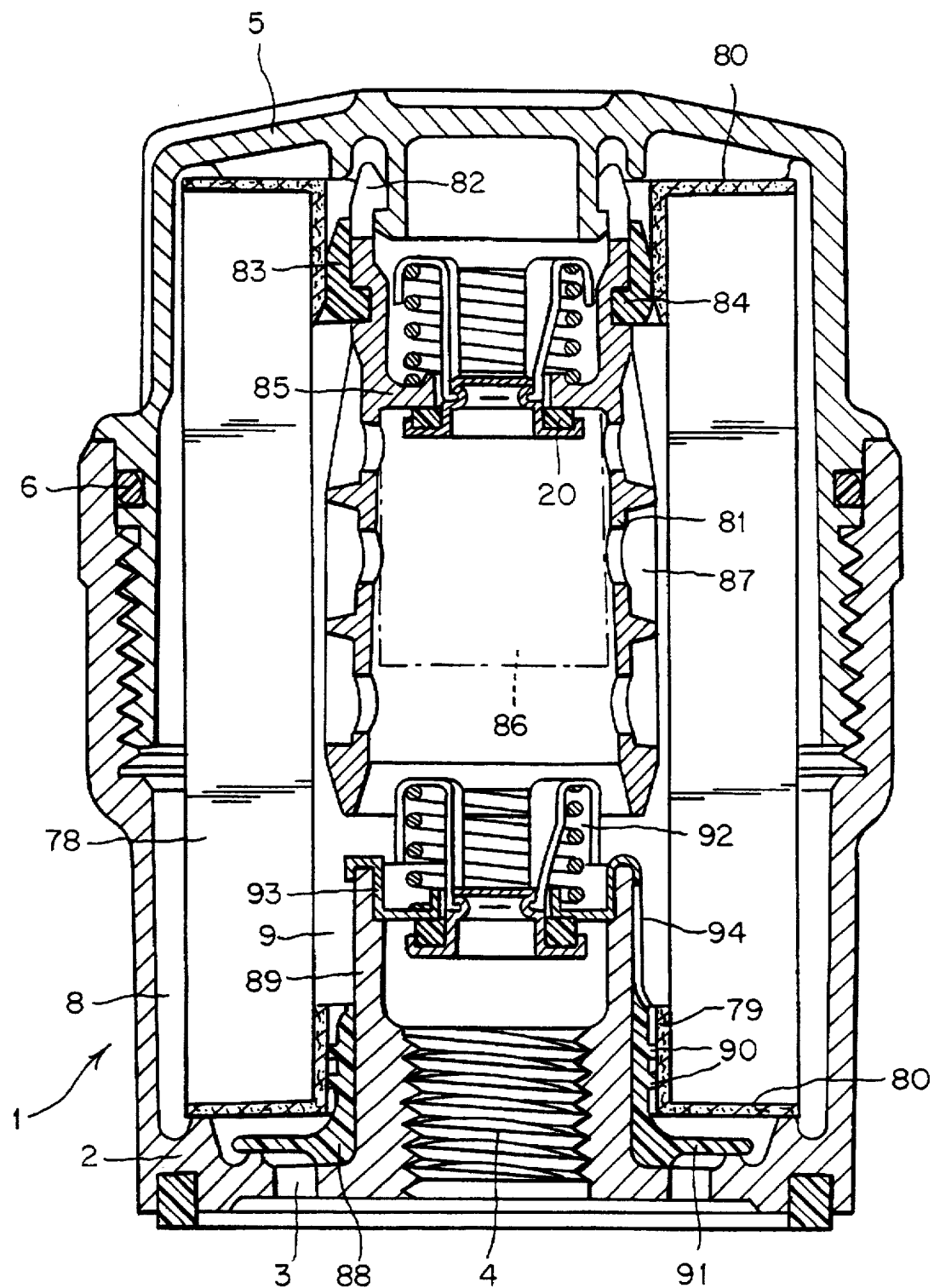
FIG. 4 shows a sectional view of a fourth embodiment of a filter for liquids according to the invention.
Figure 5:
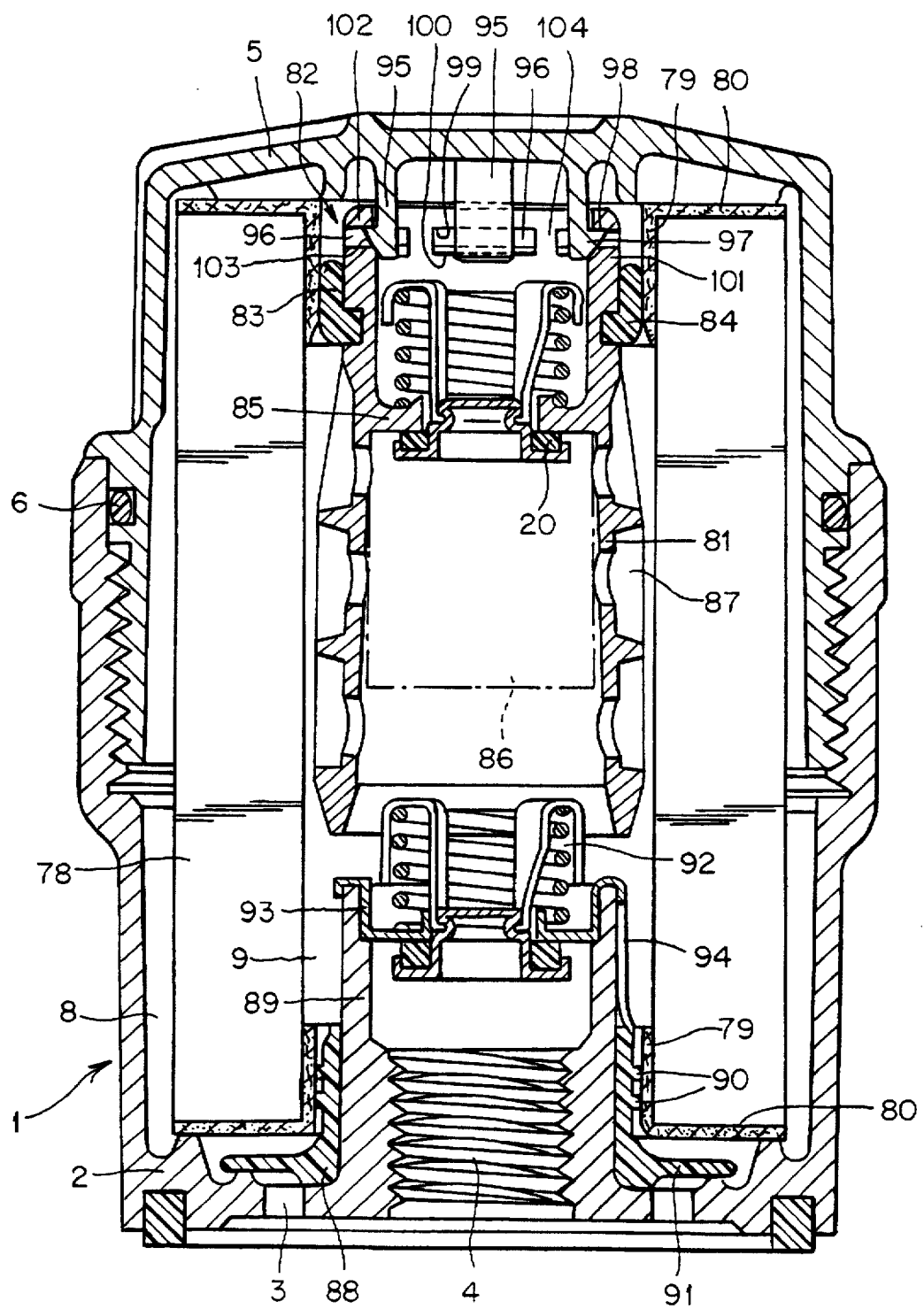
FIG. 5 shows a sectional view of a fifth embodiment of a filter for liquids according to the invention.

With other exemplified embodiments of a filter for liquids according to FIGS. 4 and 5, the same reference numerals as in FIGS. 1 and 2, respectively, are used for identical parts.

A star-shaped filter element 78 manufactured from paper is provided at each of its ends on its inner circumference with a sleeve 79 made of strengthened paper, on which a paper end disk 80 is shaped by molding in one piece, sealingly closing the axial face edges of the filter element 78. By manufacturing such a filter element from a single material, it is assured that said element can be disposed of as waste in an environment-friendly way when the filter is changed.

For receiving a part of the individual elements, a support part 81 is fixed on the housing cover 5 by means of the snap connection 82. A first radial seal 83 separating the crude space 8 from the clean space 9 is supported on the support part 81, whereby, for example, an extension 84 engages in a groove of the support part 81. In an intermediate wall 85 of the support part 81, an overflow valve 20—distributed over the outer circumference of the support part—axially extending support ribs 87 on the support part 81 shaped.

For receiving a second radial seal 88 separating the crude space 8 from the clean space 9, a tubular short pipe 89 projecting into the interior of the filter for liquids is molded as one piece onto the filter housing 2 in the center. Via the sealing lips 90 molded onto said radial seal 88, the latter can rest against the sleeve 79 arranged on the filter element 78. Furthermore, a return check valve 91 blocking the feed opening 3 can be joined with the radial seal 88, forming one piece with the latter. The return check valve 91 can be additionally elastically prestressed, for example via a spring metal sheet plate supported in the short pipe 89. In order to prevent the clean space 9 from running dry during an operational standstill, a return check valve 92 is fastened on the short pipe 89, whereby its ring disk 93 is provided with the tongues 94, the latter being distributed over the circumference and serving for securing the position of the radial seal 88.

The difference between FIG. 4 and FIG. 5 is that in FIG. 5, the snap connection 82 is designed to be releasable.

The releasable snap connection between the housing cover 5 and the support part 81 comprises the four hook shaped lugs 95, which are circumferentially evenly distributed on the inner bottom of the cover and which project into the interior of the housing and engage in matching, closed recesses 96 of the support part 81, said recesses being provided at that end of support part 81 that faces the cover 5. After the lugs 95 have snapped in, a cam 97 of each lug 95 rests with its sharp edge against a sharp-edged clawing side 99 of the recess 96 in the locking direction, so that an unintentional detachment of the support part 81 from the housing cover 5 is impossible even under extreme pressure conditions in the interior of the filter. The other three sides of the recess 96 may be provided in the releasing direction with the bevelled surfaces 100 depending on which type of release (turning or axial displacement) is intended. At the top end 101 of the support part 81, the recesses 96 are molded in in such a way that a ring 102, the latter extending all around, is still present on the support part 81.

When the cover 5 and the support part 81 are mounted, the support part 81 is pushed with its ring 102 over a molded incline 103 of the hook-shaped lugs 95 in the direction of the bottom of the cover in such a way that the cams 97 of the lugs 95 subsequently lock in the recesses 96.

When the cover 5 and the support part 81 are dismantled, the support part 81 is first pushed in the direction of the cover 5, so that the cams 97 of the lugs 95 are guided across the bevelled surfaces 100 of the recesses 96 and come to rest on the inside against the end 101 of the support part 81. Subsequently, the support part 81 is turned to such an extent that when the support part 81 is subsequently pulled off, the lugs 95 will slide across the guide bridges 104, the latter being disposed between the recesses 96 and connecting the end 101 of the support part 81 with the ring 102 of the support part 81, without locking in the recesses 96.

With the shown exemplified embodiment of such a filter for liquids, a separate and environmentally friendly waste disposal is assured when the filter is changed due to the utilization of single materials for the individual filter elements.

Furthermore, the special constructional embodiment of the support part receiving the functionally required individual parts assures that the exchangeability and/or reuse of each individual part is possible, i.e., for example, the support part can be completely exchanged or reused, only the seals and/or the filter elements can be replaced separately, or the valuable filter housing can be reused per se because no other individual parts (wear parts) are rigidly integrated in said housing. Such a design of the filter for liquids permits a use according to the unit construction system, so that it is even possible to omit, for example the one or other valve without any further measures.

We claim:

1. Liquid filter comprising:

a pot-shaped housing with a closed bottom and an open top;

the open top of the pot-shaped housing being closed by a screw cap threadedly engaged within said open top;

a support part having an upper end fastened with a snap connection device to the screw cap and having a sleeve-shaped extension defining a lower end of said support part;

an exchangeable annular filter element including a pair of open ends;

wherein the annular filter element includes a pair of imperforate sleeves respectively fastened within said open ends thereof which bear radially inwardly tightly on the sleeve-shaped extension;

wherein the sleeve-shaped extension of the support part has a radially permeable tube region surrounded by said filter element and has seals of approximately a same external diameter as an internal diameter of the sleeves on the filter element;

whereby the seals and sleeves coact to removably seal the filter element to the radially permeable tube region;

wherein upper and lower regions of the sleeve-shaped extension on which the sleeves of the annular filter element bear radially tightly merge directly into the radially permeable tube region of the support part;

wherein a tubular interior of the sleeve-shaped extension surrounded by the annular filter element is axially closed in the upper region of the radially tight bearing of the annular filter element which lies at an upper end of the sleeve-shaped extension facing the screw cap;

wherein said tubular interior of the sleeve-shaped extension is axially open at the lower end;

wherein flow takes place radially through the annular filter element from an outside to an inside thereof, for which purpose the pot-shaped housing has an inlet for the liquid to be filtered, which inlet is connected to a space radially outside the filter element;

wherein a first outlet duct for filtered liquid lies in the bottom of the pot-shaped housing and sealingly receives the lower end of the sleeve-shaped extension to connect the interior of the permeable tube section to said first outlet duct;

wherein a second outlet duct is provided in the closed bottom of the filter housing coaxially within said first discharge duct;

wherein said support part includes a central tube extending through an inside the annular filter element fastened on said sleeve-shaped extension having a lower free end which is remote from the screw cap for insertion into the second outer duct to close the second outlet duct when the screw cap installed within the upper open end of the housing; and wherein the free end of the central tube is withdrawn from the second outlet duct open to open the second outlet duct when the screw cap is removed from the upper open end of the housing.

2. Filter for liquids for an internal combustion engine comprising:

a filter housing having an open top;

a removable cover for closing the open top of said housing;

a ring-shaped exchangeable filter element positioned within lower portion of the housing;

a support part separable from the ring-shaped exchangeable filter element and extending centrally through an interior space of the filter element and is supported in the filter housing;

a crude space is separated from a first clean space by means of radial inner seals mounted at axial ends of the ring-shaped exchangeable filter element;

wherein the ring-shaped exchangeable filter element is folded and sealed on opposite ends thereof and provided on an inside at each of its opposite ends with a sleeve for resting against said radial inner seals;

wherein said ring-shaped exchangeable filter element is a primary-flow filter element;

a separately exchangeable secondary-flow filter element is supported on the support part and positioned in an upper portion of the housing;

wherein said support part has an annular pot part having an open top and a closed bottom for receiving and supporting the secondary-flow filter element;

wherein said annular pot part comprises a first part defining a perforated tubular outer wall positioned radially between an outer periphery of said secondary-flow filter element and said crude space, a tubular short leg having an inner periphery rigidly connected to said support part, and an imperforate annular wall defining a center bridge for connecting said tubular short leg to a lower end of said perforated outer wall;

wherein said annular pot part comprises a second part having a perforated tubular inner wall positioned radially between an inner periphery of said secondary-flow filter element and a second clean space, and an imperforate annular wall connected to a lower end of said perforated tubular inner wall and extending radially outwardly;

wherein said second part is positioned within the first part and the imperforate annular walls of said first and second parts are welded to each other;

releasable cover means for dosing the open top of said annular pot part; and wherein said center bridge has coaxially has mounted thereon an extension for receiving the primary-flow filter element;

wherein said housing includes an inlet duct, a first discharge duct, and a second discharge duct;

wherein said support part includes first outlet means for connecting said first clean space to said first discharge duct;

and wherein said support part includes second outlet means for connecting said second clean space to said second discharge duct.

3. Filter for liquids according to claim 2, wherein the material for the sleeve is the same type of material as the one which the filter element is made.

4. Filter for liquids according to claim 2, wherein the filter element folded in the form of a star has glued pockets at its axial face sides.

5. Filter for liquids according to claim 2, wherein the material for the filter element is paper.

6. Filter for liquids according to claim 2, wherein the support part comprises plastic material.

7. Filter for liquids according to claim 2, wherein on an outer periphery of extension, there are annular recesses for receiving ring seals.

8. Filter for liquids according to claim 2, wherein the cover axially prestresses the secondary-flow filter element.

9. Filter for liquids according to claim 2, wherein the support part is fixed on the housing cover by means of a snap connection.

10. Filter for liquids according to claim 2, wherein the support part is detachably connected with the housing cover.

11. A filter for liquids comprising;
a pot-shaped housing with a pot bottom arranged below an open top;
a screw-on cover threadedly engaged within said open top;
one exchangeable ring-shaped filter insert positioned within a lower portion of said housing configured for flow radially from an outside to an inside thereof;
said housing including an inlet duct;
a first oil discharge duct in the bottom of said housing;
a second off discharge duct in the bottom of the housing and coaxially surrounding said first oil discharge duct;
means for for opening the first oil discharge duct including a support part having a first end which is connected to the cover in an axially force-transmitting manner and a second free end, wherein said second free end projects into the first oil discharge duct when the cover fully threadedly engaged to the open end of said housing to sealingly close the discharge duct, and wherein said second free end is withdrawn from the discharge duct when the cover is removed from the open end of the housing to enable discharging of oil from the housing via the first oil discharge duct;
wherein said ring-shaped filter insert is a primary flow filter element;
a separately exchangeable secondary flow filter element positioned in an upper portion of said housing;
wherein said support part extends through said primary and secondary flow filter elements;
wherein said support part has a ring-shaped pot part having an open top and a closed bottom for receiving and supporting the secondary flow filter element;
wherein said ring-shaped pot part comprises a first part defining a perforated tubular outer wall positioned radially between an outer periphery of said secondary-flow filter element and said crude space, a tubular short leg having an inner periphery rigidly connected to said support part, and an imperforate annular wall defining a center bridge for connecting said tubular short leg to a lower end of said perforated outer wall;
wherein said annular pot part comprises a second part having a perforated tubular inner wall positioned radially between an inner periphery of said secondary-flow filter element and a first clean space, and an imperforate annular wall connected to a lower end of said perforated tubular inner wall and extending radially outwardly;
releasable cover means for dosing the open top of said annular pot part;
wherein said second part is positioned within the first part and the annular imperforate walls of said first and second parts are welded to each other; and
wherein the center bridge of said first part has coaxially attached thereto a perforated sleeve-shaped extension positioned radially between an inner periphery of the primary flow filter element and a second clean space;
wherein said support part defines a flow channel for connecting said first clean space to said first discharge duct;
and wherein a lower end of said sleeve-shaped extension is sealingly received within said second discharge duct and defines a flow channel connecting said second clean space to said second discharge channel.

12. Filter for liquids according to claim 11, wherein the support part comprises a central tube and said extension is a sleeve-shaped radially permeable extension which at least partly surrounds the tube at a radial distance for receiving at least one filter element.

13. The filter for liquids according to claim 11, wherein ring-shaped recesses are provided in the sleeve-shaped extension for receiving ring seals.

* * * * *